March 14, 1961 J C. MILLER ET AL 2,974,646
ROTARY ACTUATOR
Filed Nov. 2, 1959
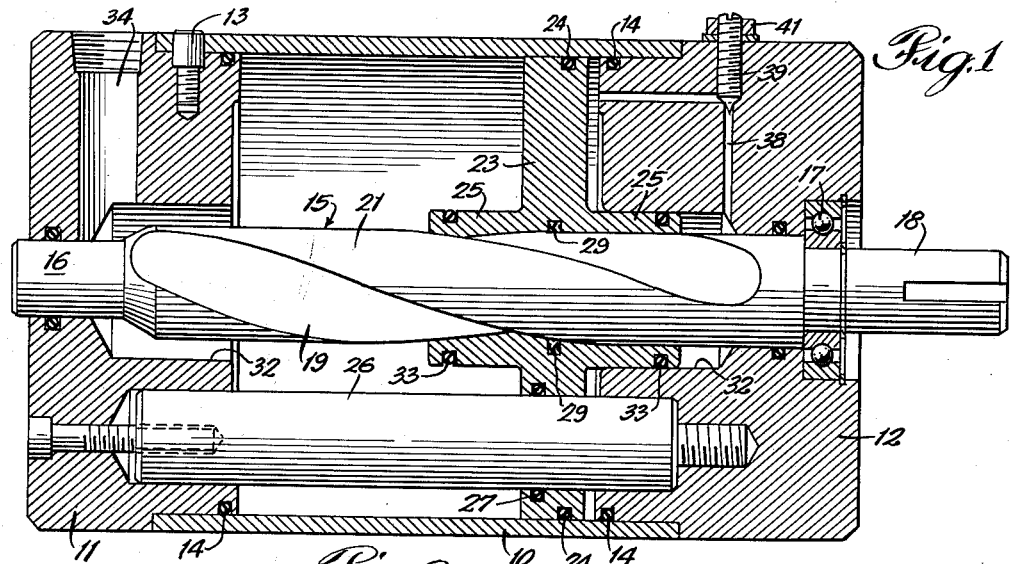
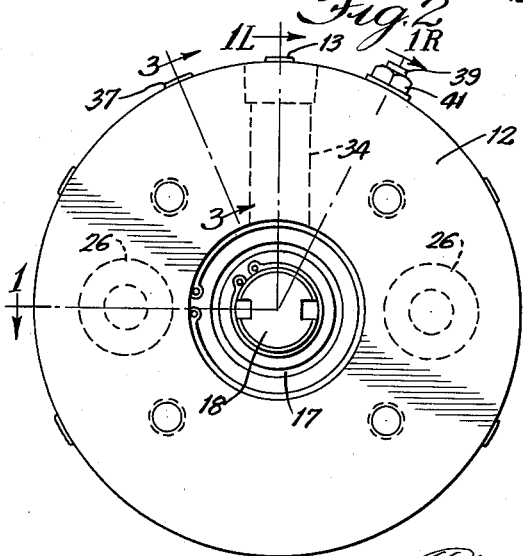
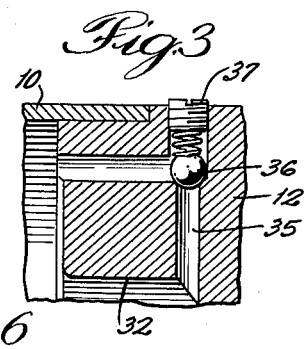
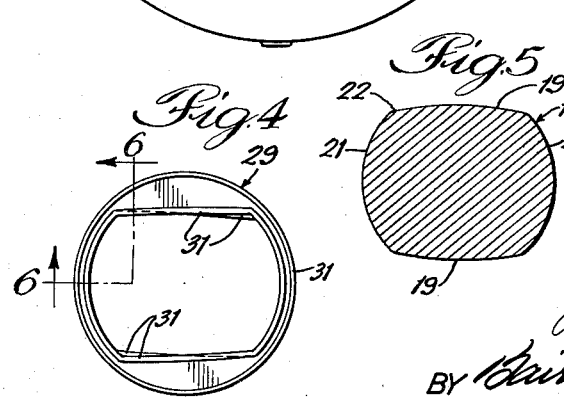
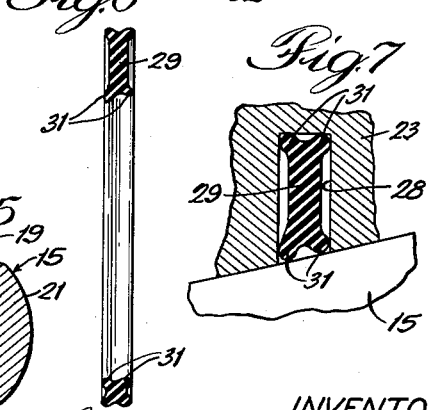
INVENTOR:
J. Carter Miller
and Robert W. Lanman,
BY Blair, Freeman & Molinare
ATTORNEYS.

United States Patent Office 2,974,646
Patented Mar. 14, 1961

2,974,646
ROTARY ACTUATOR

J Carter Miller, Munster, and Robert W. Lanman, Hammond, Ind., assignors to Carter Controls, Inc., Lansing, Ill., a corporation of Illinois Filed Nov. 2, 1959, Ser. No. 350,456

5 Claims. (Cl. 121—119)

This invention relates to rotary actuators and more particularly to a pressure operated device for producing accurately controlled rotation of a shaft in response to linear movement of a fluid actuated piston. One difficulty encountered in fluid operated rotary actuators has been the maintenance of a fluid tight seal between the piston and the spirally machined shaft so that different accurate angular positions of the shaft can be achieved. Various types of sealing structures have been tried, but due to the peculiarities of the spiral surfaces on the shaft, none of them has been able to maintain a fluid tight seal over a very long period of use.

It is therefore one object of the present invention to provide a rotary actuator in which an opening in the piston is securely sealed against the spiral surface of the shaft and the seal is maintained over a long period of use.

According to a feature of the invention, the seal is peculiarly constructed to engage uniformly against the spiral shaft surface and to be urged against the shaft surface and the receiving groove in the piston by fluid pressure.

Another difficulty encountered in piston type rotary actuators is banging or slapping of the piston against the end of its housing when it is moved through a full stroke. This action not only tends to damage the actuator itself, but may also result in damage to the actuated mechanism due to abrupt stopping thereof.

It is therefore a further object of the invention to provide a rotary actuator in which movement of the piston toward the ends of the housing is cushioned by trapping and gradually releasing fluid.

According to a feature of the invention, the piston is formed with extensions at its ends which sealingly enter bores at the ends of the housing as the piston approaches the housing ends to trap fluid between the piston and the end of the housing by closing of a check valve which trapped fluid is bled out through a restricted passage to regulate the rate of movement of the piston.

The above and other objects and features of the invention will be more readily apparent from the following description when read in connection with the accompanying drawing, in which:

Figure 1 is a longitudinal section through a rotary actuator embodying the invention with the left end being on the angular section line 1L–1 and the right end being on the angular section line 1R–1 of Figure 2;

Figure 2 is an end view looking from the right in Figure 1;

Figure 3 is a partial section on the line 3—3 of Figure 2;

Figure 4 is an elevation of a seal according to the invention;

Figure 5 is a section through the spiral portion of the rotary shaft;

Figure 6 is a section through the seal on the broken line 6—6 of Figure 5; and

Figure 7 is an enlarged section illustrating the seal installed.

The rotary actuator, as shown in Figure 1, comprises a housing formed by a cylindrical sleeve 10 closed at its ends by end closure members 11 and 12. Each of the closure members 11 and 12 is cylindrical in outline and is recessed at its periphery at the inner end portion thereof to receive the ends of the sleeve 10. The end members are held assembled to the sleeve by screws 13 threaded through the end portions of the sleeve and into the end members. Annular seals, such as O-rings 14, may be provided to form a fluid tight connection between the sleeve 10 and the end members.

A shaft, indicated generally at 15, extends axially and rotatably through the housing and is supported for rotation in suitable bores in the end members. The end member 11, as shown, is somewhat narrower than the end member 12 and the shaft 15 has a reduced circular extension 16 which extends through an opening in the end member 11 for support. The end member 12 carries a bearing 17, such as a ball bearing supporting an extension 18 on the shaft through which the shaft is connected to a mechanism to be driven.

The central portion of the shaft, as best seen in Figure 5, is formed with opposite relatively flat sides 19 connected by arcuately shaped sides 21 with the connections therebetween rounded, as indicated at 22, to provide a smooth continuous surface. The sides 19 are slightly convex, as illustrated, and blend smoothly into the arcuate sides 21 through the curved portions 22 so that the shaft through its central working portion has a smooth continuous periphery. The sides 19 and the connecting sides 21 of the shaft section are twisted or formed into a relatively flat helix, as clearly shown in Figure 1, so that the shaft will be turned by longitudinal movement of the piston, as described more fully hereinafter.

A piston 23 is slidable in the central cylindrical portion of the housing and may be provided with a peripheral seal 24, such as an O-ring, to prevent leakage of fluid between the periphery of the piston and the housing. At its central part, the piston is formed with an elongated hub portion having annular extensions 25 projecting from the ends of the piston and defining a central bore therethrough complementary in shape to the twisted or helical portion of the shaft 15. The piston is held against rotation in the housing by guide rods 26 rigidly secured between the end members 11 and 12 and fitting slidably through openings in the piston. As best seen in Figure 2, there are two diametrically opposite guide rods 26, although more or less could be provided, if desired. The guide rods are prevented against leakage by annular seals 27, such as O-rings mounted in annular grooves in the piston and engaging the guide rods.

In order to seal against fluid leakage around the shaft 15 where it extends through the opening in the piston hub, a special seal construction, as best shown in Figures 4, 6 and 7, is provided. As there shown, the piston is formed interiorly of the central opening therethrough with an annular groove 28 of rectangular section opening toward the shaft 15. The outer portion of the groove 28 is preferably circular while the inner portion thereof at the face of the opening through the piston follows the contour of the cross section of the shaft 15. As best seen in Figures 6 and 7, the seal 29 is generally rectangular in cross section and is relieved at each of its four sides to leave corner bead portions 31 at its corners which in the installed condition, as shown in Figure 7, will engage the sides of the groove 28 and the adjacent face of the shaft 15 with spaces being left between the walls of the groove and the engaging wall of the shaft 15 at the corners of the rectangular sectioned opening into which the seal fits. As shown in Figure 4, the corner beads 31 at the substantially straight sides of the central opening in the seal lie at an acute angle to each other which is relatively flat and which corresponds to the helical angle of the surfaces of the shaft 15. The corner beads 31 at these flat sides of the seal opening cross each other centrally of the length of such sides and angle slightly in opposite directions. Thus when the seal is installed the flat sides of the central opening therethrough will fit against the flat sides 19 of the shaft 15 and the corner beads adjacent to the shaft will follow accurately the twist in the flat sides 19 so that they will engage the flat sides 19 throughout the full width thereof.

Furthermore, due to the construction of the seal pressure applied to the piston will act on the seal tending to press it more tightly against the adjacent surfaces so that leakage will positively be prevented under all operating conditions. Assuming, for example, that pressure is applied from the right, as seen in Figure 1, this pressure will tend to leak past the adjacent bead 31 into the space between the right side of the groove 28 and the seal to press both the outer and inner corner beads 31 radially toward the radially outer surface of the groove 28 and toward the shaft 15. In this way, the sealing pressure will be increased proportionately to the applied operating pressure to insure against fluid leakage under all operating conditions.

According to another feature of the invention, movement of the piston 23 toward the ends of the housing is cushioned toward the last portion of the movement to avoid severe slapping or banging. For this purpose, each of the end members 11 and 12 is formed with a cylindrical bore 32 of larger diameter than the adjacent portions of the shaft 15 and coaxial therewith and of a diameter slidably to receive the piston extensions 25. The piston extensions 25 may carry seals, such as O-rings 33, to limit leakage between the extensions and the walls of the bores 32, although a minor amount of leakage at this point is not critical.

Each end member of the housing is formed with a fluid inlet and outlet port 34 adapted to be connected to external piping and opening into the outer end of the adjacent bore 32, as best seen at the left of Figure 1. Communication between the ports 34 and the interior of the housing within the end members is provided by angular passages 35, as best seen in Figure 3, opening into the outer ends of the bores 32 and through the inner faces of the end members into the interior of the housing. A check valve 36 opening toward the interior of the housing is provided in each of the passages 35 and is preferably held in place by a screw plug 37 threaded into the housing interior.

Additional communication is provided, as seen at the right side of Figure 1, by an angular passage 38 extending from the outer ends of the bores 32 to the inner faces of the end members. The passages 38 may be variably restricted by needle valve members 39 screw threaded through the exteriors of the end members and secured in adjusted position by lock nuts 41.

Assuming that the piston is at the right end of the housing, as shown in Figure 1, and is to be moved toward the left end, pressure will be applied at the port 34 at the right end of the housing and the port at the left end of the housing will be vented or connected to a low pressure source. The check valve 36 at the right end of the housing will open at this time so that the full area of the piston is exposed to high pressure to urge it to the left. During the initial movement, the piston can move relatively freely except for the load imposed on it by the shaft and the shaft will be turned proportionately to the piston movement. It will be appreciated that the pressure may be cut off at any desired point and both ports may be closed or both opened so that the piston and the shaft will be held accurately in their then adjusted positions since the helix angle is non-reversible or self-locking. However, if the piston is to be moved fully to its extreme left end position, its relatively free movement will continue until the extension 25 at the left side of the piston has entered the bore 32 at the left end of the cylinder. After this occurs, the fluid trapped between the outer part of the piston and the left end member 11 will be compelled to flow entirely through the restricted passage 38 due to closing of the check valve 36 so that the last portion of the movement of the piston will be cushioned. The degree of cushioning can be controlled within close limits by adjustment of the valve 39 which throttles the flow of fluid through the passage 38 so that any desired degree of cushioning effect can be achieved. To move the piston from the left to the right, pressure is applied through the left-hand port 34 with the right-hand port being vented or connected to low pressure and the operation will be the same as that described above, but in the reverse direction.

While one embodiment of the invention has been shown and described herein, it will be understood that it is illustrative only and not to be taken as a definition of the scope of the invention, reference being had for this purpose to the appended claims.

What is claimed is:

1. A rotary actuator comprising a cylindrical housing, a shaft extending axially and rotatably through the housing, a piston slidable in the housing having a central opening within which the shaft fits slidably, and means to hold the piston against turning as it slides in the housing, the shaft having substantially flat spirally twisted opposite sides joined by arcuately curved sides and the opening in the piston having a complementary shape and being formed with an internal annular groove, and an annular sealing ring in the groove and sealing against the outer surface of the shaft, the sealing ring being generally rectangular and being relieved on its sides between its corners to leave enlarged corner portions engaging the sides of the groove and the surface of the shaft.

2. The rotary actuator of claim 1 in which the sealing ring is formed with a central opening complementary in shape to the shaft and the corner portions at the substantially straight sides of the opening are at an angle to each other conforming to the spiral angle of the flat sides of the shaft.

3. The rotary actuator of claim 1 in which the housing is formed adjacent to one end with a reduced diameter cylindrical bore, an extension on the adjacent side of the piston to fit slidably into the reduced bore when the piston is adjacent to said one end of the housing and to move out of the reduced bore when the piston is moved away from said one end of the housing, a fluid inlet and outlet port at said one end of the housing communicating with the outer end of the bore, a connection from the port to the interior of the housing at said one end thereof including a check valve opening toward the housing interior, and a restricted connection from the port to the interior of the housing at said one end.

4. A rotary actuator comprising a cylindrical housing, a shaft extending axially and rotatably through the housing and having within the housing substantially flat spirally twisted sides joined by arcuately curved sides, a piston slidable in the housing and having a central opening fitting over the shaft and complementary thereto, means to hold the piston against turning in the housing whereby it will turn the shaft as it slides in the housing, the housing being formed adjacent to at least one end with a reduced diameter axially extending bore, an extension on the adjacent side of the piston to fit slidably and sealingly in the bore when the piston is adjacent to said end of the housing and to move out of the bore when the piston is away from said end of the housing, fluid inlet and outlet ports at the ends of the housing, the port at said one end of the housing having fluid connections to the outer ends of the bore and the housing interior, a check valve in one of the connections opening away from the port, and means defining a restricted by-pass around the check valve.

5. A rotary actuator comprising a cylindrical housing, a shaft extending axially and rotatably through the housing and having within the housing substantially flat spirally twisted sides joined by arcuately curved sides, a piston slidable in the housing and having a central opening fitting over the shaft and complementary thereto, means to hold the piston against turning in the housing whereby it will turn the shaft as it slides in the housing, the housing being formed adjacent to at least one end with a reduced diameter axially extending bore, an extension on the adjacent side of the piston to fit slidably and sealingly in the bore when the piston is adjacent to said end of the housing and to move out of the bore when the piston is away from said end of the housing, fluid inlet and outlet ports at the ends of the housing, the port at said one end of the housing communicating with the outer end of the bore and having a fluid connection to the adjacent end of the housing interior, a check valve in the connection opening toward the housing interior, and a second restricted connection between said port and the housing interior.

References Cited in the file of this patent

UNITED STATES PATENTS

| | | |
|---|---|---|
| 704,978 | Taylor | July 15, 1902 |

FOREIGN PATENTS

| | | |
|---|---|---|
| 201,107 | Australia | Feb. 17, 1956 |